INVENTOR.
Harry F. Olson
BY Morris D. Rabkin
ATTORNEY.

Dec. 13, 1960　　　H. F. OLSON　　　2,964,272
VIBRATION CONTROL APPARATUS
Filed July 1, 1955　　　2 Sheets-Sheet 2
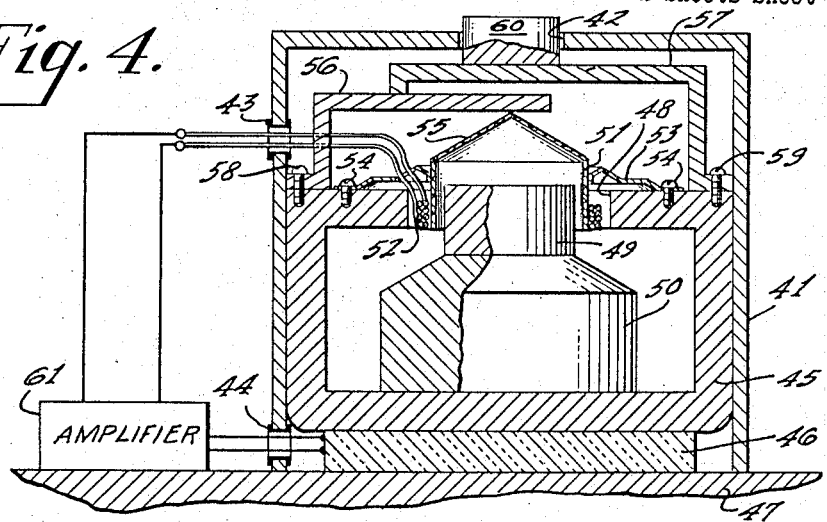
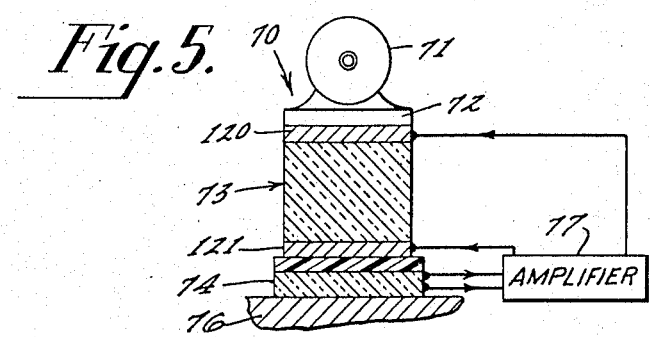
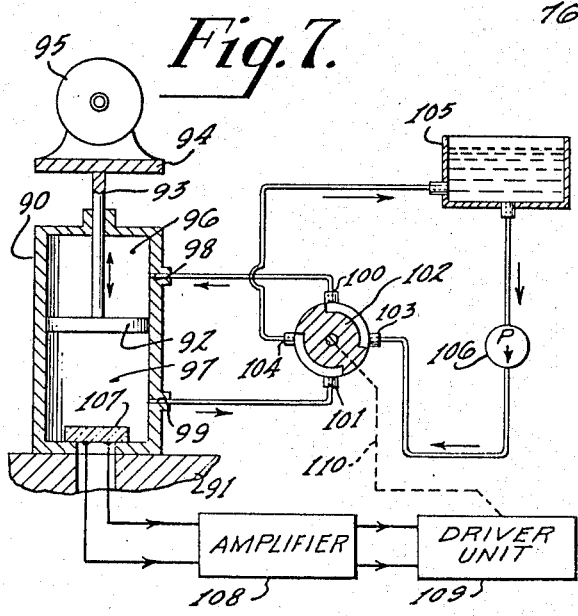
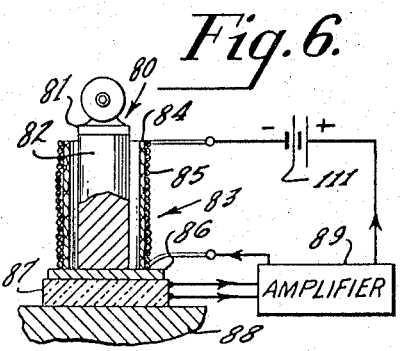
INVENTOR.
Harry F. Olson
BY
ATTORNEY.

United States Patent Office 2,964,272
Patented Dec. 13, 1960

2,964,272

VIBRATION CONTROL APPARATUS

Harry F. Olson, Princeton, N.J., assignor to Radio Corporation of America, a corporation of Delaware Filed July 1, 1955, Ser. No. 519,599

10 Claims. (Cl. 248—19)

The present invention relates to apparatus for controlling mechanical vibration. More particularly, this invention is related to apparatus for controlling vibration of vibrating structures and vibrations caused elsewhere by vibrating structures, such as machinery, by electronic means.

Vibration is a serious problem in machine design. Special precautions must be taken to protect delicate machine elements from the adverse effects of vibration. Moreover, excessive and continued vibration may result in fatigue failure. Vibration is, furthermore, disturbing to personnel since the resulting noise and physical oscillating movement produces discomfort.

Heretofore, in order to minimize vibration, there have been provided means, such as vibration-absorbing mountings, mechanical springs and dash pots. Many types of mountings employ rubber, cork or felt. In machines that have rotating shafts or rotors, a balancing weight may be placed in a position to compensate for vibration producing unbalanced rotating masses. The present invention controls or eliminates vibrations by means of a system containing active elements, as opposed to passive elements, which are illustrated by the above-mentioned vibration minimizing means. Vibration control elements of the present invention may be considered active in that they actively function to counteract vibrations of the vibrating structure or actively prevent induced vibration in a normally static structure.

Vibration control apparatus provided by the present invention comprises three primary elements. They are a driving element, a vibration sensing element and an electrical signal amplifier. In the interest of brevity, the driving element will be called the driver and the sensing element will be called the sensor. The vibrating structure, a machine for example, is supported by or connected to the driver. The sensor may be in contact with both the driver and the normally static structure. The sensor includes means, such as a piezoelectric transducer, which is sensitive to external vibrations, and produces an electrical signal, corresponding to these vibrations, which is applied to the amplifier. The amplifier supplies a more powerful electrical signal to operate the driver. The driver translates the electrical energy supplied thereto into mechanical force which may be applied to the machine and to the static structure. By adjusting the phase response of the amplifier the driver may be operated to exert forces which counteract the vibratory forces produced by the machine. Therefore, the vibration of the machine will be counteracted. Alternatively, the phase response of the amplifier may be adjusted so that the driver exerts forces which damp induced vibration of the static structure. Therefore, the static structure may be isolated from vibration.

It is an object of the present invention to provide apparatus for controlling vibration of structures by electronic means.

It is a further object of the present invention to provide a system for vibration control using active elements.

It is another object of the present invention to provide an electronic control system for the reduction and isolation of vibrations which are generated by vibrating structures such as machinery.

It is still another object of the present invention to include in a system for vibration control, active elements which are responsive to vibrations and function to counteract the effects of such vibrations on a desired structure.

It is still another object of the present invention to isolate a normally static structure, such as a floor, from vibrations due to external bodies.

Other objects and advantages of the present invention will, of course, become apparent and immediately suggest themselves to those skilled in the art to which the invention is directed from a reading of the following description in connection with the accompanying drawing in which:

Figure 4 is a front view, partially in section, showing an embodiment of the present invention;

Figure 5 is a front view, partially in section, diagrammatically showing another embodiment of the present invention.

Figure 6 is a front view, partially in section, showing, diagrammatically, still another embodiment of the present invention; and Figure 7 is a schematic presentation of still another embodiment of the present invention.

Figure 1:
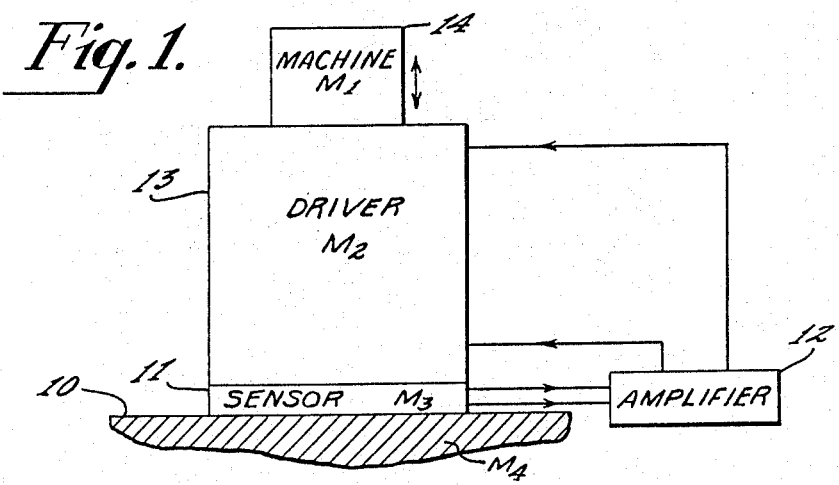
Fig. 1 is a simplified structural diagram of the present invention in a form which is useful in illustrating the principles of operation thereof.

Referring now to the drawing, a simplified structural representation of the vibration control apparatus of the present invention is shown in Figure 1. Supported on some base structure 10 is a sensor 11. The sensor 11 is an element sensitive to vibrations which produces an electrical signal output, such as voltage of a variable amplitude, corresponding to vibration. A piezoelectric element, for example, may be enclosed in the sensor 11. The electrical signal output from the sensor 11 is applied to the input of an amplifier 12.

The amplifier 12 may comprise a number of stages of voltage amplification and power amplification. The design of the amplifier 12 may be conventional. Therefore, the circuitry therein will not be discussed in detail herein.

Seated on top of the sensor is a driver 13. The driver 13 supports a vibratory body such as a machine 14. The driver 13 is connected to the output of the amplifier 12. Movement of the driver 13 will correspond to the electrical signal output of the amplifier 12. For example, the driver may be caused to move a given distance in the vertical direction in response to the amplitude of the output signal voltage from the amplifier 12. The polarity of the output signal voltage may determine whether the movement is upward or downward. Mechanical force is exerted upon the machine 14 as the driver moves. The term, driver, is used to designate the element 13 because forces are exerted upon the machine 14 and movement of the machine 14 may be caused by such forces.

The machine 14 is a vibratory body and oscillates in the vertical direction as indicated by the arrow in Figure 1. The driver 13 exerts forces on the machine 14 and on the base 10 in response to the electrical signal from the amplifier 12. These forces may be applied to counteract either the vibration of the machine 14 or the vibration of the base 10 which is induced by vibration of the machine 14.

Figure 2:
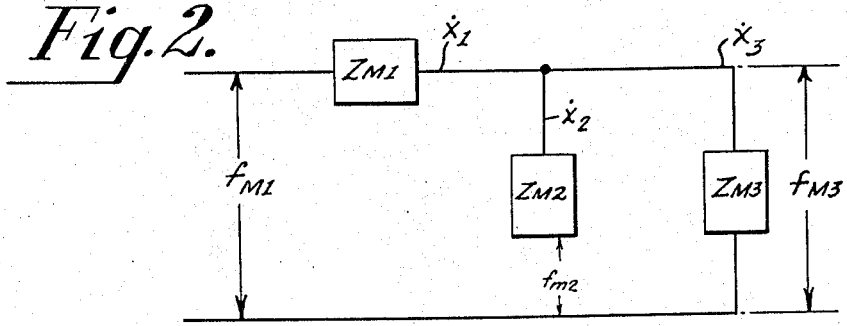
Figure 2 is an electrical analog of the mechanical system shown in Figure 1.

The principle of operation of vibration control apparatus provided by the present invention will be best explained in connection with Figure 2. Figure 2 is an electrical analog of the mechanical system shown in Figure 1. In Figure 2, $Z_{M1}$ corresponds to the mechanical impedance of the vibratory body, which is the machine 14 in Figure 1. $Z_{M2}$ corresponds to the mechanical impedance of the driver 13 and the sensor 11. $Z_{M3}$ corresponds to the mechanical impedance of the terminal element such as the base 10. $f_{M1}$ is the vibratory driving force produced by the machine 14. $f_{M2}$ is the driving force produced by the driver. $f_{M3}$ is the driving force, such as the vibration at the base 10. $\dot{x}_1$ designates the vibrational velocity of the machine 14. $\dot{x}_2$ designates the vibrational velocity of the driver 13. $\dot{x}_3$ designates the vibrational velocity at the base 10.

The velocity $\dot{x}_3$ may be expressed as follows:

$$\dot{x}_3 = \frac{f_{M1} Z_{M2} - f_{M2} Z_{M1}}{Z_{M1} Z_{M2} + Z_{M1} Z_{M3} + Z_{M2} Z_{M3}} \quad (1)$$

where $Z_{M1}$ = mechanical impedance of the machine $M_1$,
$Z_{M2}$ = mechanical impedance of the driver $M_2$ and sensor $M_3$, and
$Z_{M3}$ = mechanical impedance of the support $M_4$.

It may be that a part of the mechanical impedance of the driver $M_2$ and sensor $M_3$ may be included in the mechanical impedance of the machine $M_1$ and/or the mechanical impedance of the support $M_4$.

From a consideration of Equation 1, it will be seen that the magnitude of the velocity $\dot{x}_3$ can be reduced by the application of the force $f_{M2}$ in the proper magnitude and phase. For example, $\dot{x}_3 = 0$ when $$f_{M1} Z_{M2} = f_{M2} Z_{M1} \quad (2)$$

Under these conditions, $f_{M3}$ is also zero. That is to say, no vibrations are produced in the support. The machine is perfectly isolated from the support.

The velocity $\dot{x}_1$ may be expressed as follows:

$$\dot{x}_1 = \frac{f_{M1}(Z_{M2} + Z_{M3}) - f_{M2} Z_{M3}}{Z_{M1} Z_{M2} + Z_{M1} Z_{M3} + Z_{M2} Z_{M3}} \quad (3)$$

From a consideration of Equation 3, it will be seen that the magnitude of the velocity $\dot{x}_1$ can be reduced by the application of the force $f_{M2}$ in the proper magnitude and phase. For example, the velocity of the machine $\dot{x}_1$ will be zero if $$f_{M1}(Z_{M2} + Z_{M3}) = f_{M2} Z_{M3} \quad (4)$$

If $\dot{x}_1 = 0$, there will be no motion of the machine. There will, however, in these conditions be a larger velocity $\dot{x}_3$.

The theory of operation of the present invention, as illustrated in Figure 1, may be considered from a physical point of view. It is observed that an input driving force $f_{M1}$ produces a vibrational driving force $f_{M3}$ at the base 10. In order to counteract the force $f_{M3}$ at the base 10, the vibration control unit may be operated to produce a compensating force $f_{M2}$ on the base 10. It may be observed that a downward force is produced on the base 10 when the machine 14 moves in a downward direction during vibration. To oppose this downward force on the base 10, the driver 13 produces an upward force. An upward force is produced on the base 10 by the driver 13 when the top of the driver moves downwardly. In moving downwardly, the driver 13 is exerting a downward force on the machine 14 which produces an upward reaction force on the base 10. This upward reaction force on the base 10 compensates the downward force $f_{M3}$ produced by the machine 14 on the base 10. Correspondingly, when the machine moves upwardly as it vibrates, the driver 13 moves upwardly. In this manner, the vibration of the base 10 produced by the machine 14 may be reduced.

It may be observed that the driver 13 executes a vibrational motion in phase with the vibrational motion of the machine 14 as it operates to counteract vibration at the base 10. Thus vibration of the top of the driver 13 is in-phase with the vibration of the machine 14. To produce this in-phase motion, the electrical signal generated by the sensor 11 is applied, after amplification, to the driver 13 without phase reversal. No phase reversal is introduced, since the electrical signal generated by the sensor 11 corresponds in amplitude and polarity variations to the vibration of the machine 14.

In order to reduce vibration of the machine 14, an oppositely directed force to the input driving force $f_{M1}$ is applied to the machine 14 by the driver 13. When the machine is moving downwardly and exerting a force in a downward direction, the driver 13 will produce motion and force in an upward direction thereby preventing the vibration of the machine 14. To achieve this result, the electrical signal produced by the sensor 11 will be reversed in phase and applied to the driver 13. The force produced by the driver 13 is, therefore, a vibrational force in phase opposition to the vibrational force produced by the machine 14.

In the majority of applicatoins for the vibration control apparatus of the present invention, it will be desirable to operate the control apparatus as a vibration isolation unit. The sensor 11 may then be placed in contact with the device or structure to be isolated from vibration produced by a vibratory body, as indicated in Figure 1. The driver 13 will be coupled to the vibratory body. Vibratory compensating forces will be applied, as outlined above, by means of a driver to the structure to be isolated so as to counteract a vibration thereof.

Figure 3:
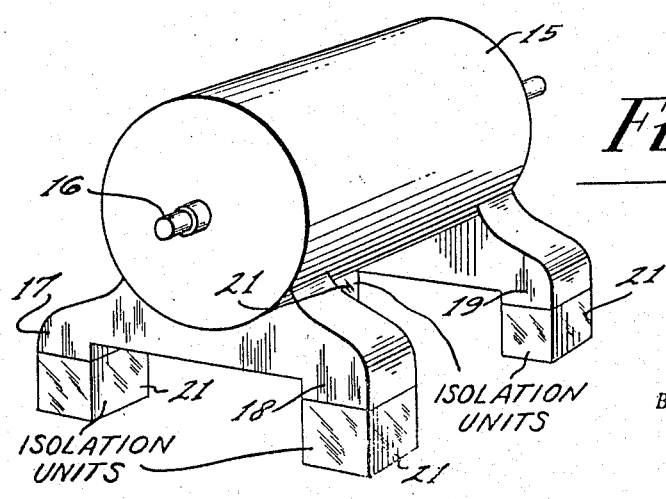
Figure 3 is a perspective view of a machine, structurally showing a manner in which the present invention may find application.

A suitable installation for vibration isolation units provided by the present invention is illustrated in Figure 3. A machine 15 which may be of the rotating type having a rotating shaft 16 is supported by a base structure. The base structure is a cradle-like arrangement having four legs 17, 18, 19 and 20. The leg 20 is not shown. Each leg 17 to 20 rests upon a vibration isolation unit 21. The vibration isolation units will operate to reduce any vibration in the structure upon which the machine 15 is supported, such as the floor. Four isolation units 21 are used, as indicated, in order to completely isolate the supporting floor from machine vibration. For example, an unbalanced rotating mass may produce stronger vibrations on one side of the machine than the other. With vibration isolation units at each end of the machine, unbalanced vibration may be more completely reduced. Moreover, the vibration at different portions of the support structure may have different phase relationships. A plurality of isolation units 21 is utilized to reduce such individual modes of vibration.

In Figure 4, there is illustrated an embodiment of a vibration control unit constructed according to the present invention. In this unit, compensating driving forces are produced by electromagnetic action. The unit is enclosed by a case 41 having a circular opening 42 in the top thereof and suitable openings 43 and 44 in the sides through which electrical conductors may pass. The present unit includes a yoke 45 of magnetic material such as iron, resting upon a sensor element 46 which is illustratively shown as a crystalline piezoelectric transducer. The sensor element 46 rests upon a supporting base such as a floor 47.

The yoke 45 is provided with an annular aperture 48 therein. A cylindrical pole piece 49 is centrally located in the aperture 48. The pole piece is secured to a cylindrical magnet 50 which is centrally located on the bottom of the yoke 45 This magnet 50 may be a permanent magnet made from material such as is sold under the trade name Alnico. Alnico designates a magnet which is made of an aluminum-nickel-cobalt-iron alloy.

A cylindrical coil form 51 having a solenoidal coil 52 wound around it is located in the gap formed between the pole piece 49 and the rim of the aperture in the yoke 45. An annular corrugated suspension 53 locates the coil form 51 in a centered position in this gap. The suspension 53 is attached to the yoke by suitable means such as screws 54. A conical dome portion 55 caps the coil form 51. A lever system consisting of a lower arm 56 and an upper arm 57 is provided. The lower arm 56 is pivoted near one end thereof on the tip of the conical cap 55. The lower arm 56 is attached at the other end thereof to the yoke 45 by means of a screw 58. The upper lever arm 57 is supported at an end point on the lower lever arm 56, and at its opposite end point on the yoke 45. A screw 59 fastens the upper lever arm to the yoke 45. A cylindrical boss 60 is attached to the upper lever arm 57. The lever arms function to increase the vertical movement of the coil 52 and coil form 51 resulting from a given vertical movement of the boss 60. A vibratory body (not shown) may be connected to the boss 60. Since the amplitude of vibrations produced by most machines is small, the lever system may be used to attenuate the magnitude of the compensating motion produced by the driving unit. To suit other conditions, the lever system may be modified by altering the effective lengths of the lever arms, to decrease the resulting movement of the coil 52 and coil form 51.

An amplifier 61 which may be similar to the amplifier 12 described above derives its input signal from the sensor 46. The output signal from the amplifier is applied to the coil 52 which is wound around the coil form 51.

In operation, electrical signals are generated corresponding to vibration produced by the vibratory body which is connected to the boss 60. Since vibratory motion normally is sinusoidal, the signal applied to the amplifier 61 will normally be a sinusoidal electrical signal. When used to isolate the floor 47 from vibration caused by the vibratory body, the sinusoidal signal applied to the input of the amplifier 61 is amplified therein and applied, without phase reversal, to the coil 52. Motion of the coil form 51 is, therefore, produced in a manner similar to the production of movement of the voice coil of a loudspeaker. Consequently, the boss 60 is driven with the coil form through the lever system, and produces vibratory motion that is in phase with the motion of the vibratory body. As previously set forth, the base or floor supporting the vibration control unit will be isolated from vibration under such conditions of operation.

In the event that the vibratory motion of a vibratory body that is connected to the boss 60 is to be reduced, the input signal is amplified by the amplifier 61 and reversed in phase. As previously brought out, such operation of the vibration control unit will produce a reduction in the amplitude of vibration of the vibratory body which is connected to the boss 60.

Figure 5 diagrammatically illustrates another embodiment of the present invention. A vibratory body is indicated as a machine 70 having a cylindrical portion 71 and a base portion 72. The driver unit 73 is indicated schematically as a body of piezoelectric material, such as barium titanate, sandwiched between two electrodes 120 and 121. The driver 73 is separated from the sensor 74 by an insulating spacer 75. The sensor 74 rests on a base such as the floor 76. An amplifier 77 derives input voltages from the sensor and applies these voltages in amplifier form across piezoelectric element in the driver 73. The driver is made to contract or expand in response to the amplitude or polarity of the voltage from the sensor 74. In this manner vibrating forces may be produced which will counteract the vibrations of the machine 70. Phase reversal in the amplifier may be provided as heretofore set forth in order to obtain vibration isolation of the floor 76 or reduction of vibration directly at the machine 70.

Figure 6 schematically illustrates a further embodiment of the present invention. In Figure 6 a machine 80 having a base portion 81 rests upon a movable driver element 82 in a driver unit 83. This element may be a cylinder of magnetostrictive material, such as an alloy containing nickel. Alloys suitable for this purpose may be chosen from those sold under the trade name "Ni-Span" in which nickel, titanium, chromium, carbon, magnesium, silicon, and aluminum are the major constituents. A coil form 84 surrounds the driver element 82. A solenoidal coil 85 is wound around the coil form 84. Both the coil form 84 and the magnetostrictive cylinder 82 forming the driver element of the driver unit 83 rest upon a spacer 86. The spacer 86 is disposed on a sensor 87 which may include a piezoelectric crystal as heretofore mentioned. The entire vibration isolation unit rests upon a base such as the floor 88. Alternating current electrical signals are applied to the input of an amplifier 89 which may be of the type heretofore described. The output of the amplifier 89 is connected across the coil 85 in the driver unit 83. A source of direct current voltage, such as a battery 111, may be connected in series with the coil 85 and the output of the amplifier 86. The coil 85, therefore, establishes an alternating magnetic field along the longitudinal axis of the cylinder 82. Since the cylinder 82 is composed of magnetostrictive material it will alternately lengthen and contract along its longitudinal axis in response to the alternating magnetic field established by means of the coil 85. Consequently, a vibration control unit constructed in accordance with this embodiment of the present invention may counteract vibration of the floor 88 or of the machine 80 in the manner previously described.

Another embodiment of the present invention is shown in Figure 7. In this embodiment a hydraulic control system is used in a vibration control apparatus. The hydraulic system functions as the driver unit. A master cylinder 90 rests upon a base structure, such as the floor 91. This master cylinder is completely enclosed and contains a piston 92 therein. A shaft 93 is connected to the piston 92 and supports a platform 94 on which a machine 95 is supported. The piston and the machine therefore may be subject to reciprocating vertical movement under the influence of hydraulic forces on the piston 92.

The piston 92 forms two chambers 96 and 97 in the master cylinder 90. A port 98 is provided in the upper chamber 96 and another port 99 is provided in the lower chamber 97. These ports 98 and 99 are connected through suitable conduits to oppositely disposed ports 100 and 101 on a four-way, two-position valve 102. The remaining ports 103 and 104 on the valve 102 are connected to inlet and outlet conduits on a source of hydraulic fluid which is under pressure.

This source of hydraulic fluid under pressure comprises a reservoir 105 and a pump 106. The high pressure side of the pump 106 is connected to one of the two remaining oppositely disposed ports 103 on the valve 102. The inlet to the reservoir 105 is connected to the other one of the remaining oppositely disposed ports 104.

A sensor 107 which may be a piezoelectric element is located on the bottom of the master cylinder 90. An electrical signal is produced by the sensor 107 in response to changes in pressure of the hydraulic fluid in the lower chamber 97 of the cylinder 90. The electrical signal produced in the sensor is applied to the amplifier 108 which may be similar to the amplifier 12 heretofore described. These input signals are amplified in the amplifier 108, and are applied to a driver unit 109. This driver unit may be similar to the driver units in the embodiments of the present invention described in connection with Figures 4, 5 or 6. For example, it may be the electromagnetic driver unit shown in Figure 4. By means of a suitable linkage, shown diagrammatically by a dashed line 110, the valve 102 may be made to oscillate between its two positions in accordance with the polarity and magnitude of the electrical signal generated in the sensor 107.

In operation, hydraulic fluid is forced into the upper chamber 96 in the cylinder 90 when the valve 102 is in the position indicated. Therefore, the piston 92 is forced to move in a downward direction in response to the hydraulic pressure in the chamber 96. The machine, therefore, will move downwardly with the piston 92. Hydraulic fluid in the lower chamber 97 passes out of the cylinder 90 through the port 99 and into the valve 102 through the port 101 therein. This hydraulic fluid passes out of the valve 102 through the port 104 and flows into the reservoir 105. When the driver unit 109 causes the valve 102 to rotate in either a clockwise or counter-clockwise direction, the alternate position of the valve 102 is assumed. In the alternate position of the valve 102, hydraulic fluid passes through the valve 102 into the lower chamber 97 of the cylinder 90. This causes the piston 92 and the machine 95 to move upwardly. It, therefore, may be observed that vibrational motion of the machine can be produced by means of the hydraulic system herein described. Moreover, the proper mode of vibration can be achieved in a suitable manner by providing a phase reversal in the amplifier 108. With the proper phase reversal, the mode of vibration of the piston 92 may be made such that the vibration of the machine 95 is directly counteracted. Alternatively vibration of the floor 91 may be reduced.

A hydraulic control system may be found suitable in vibration control apparatus that is used to reduce vibrations caused by heavy machinery. Greater forces may be applied to counteract vibration with a hydraulic system.

What is claimed is:

1. Vibration isolation apparatus comprising a driver mechanically coupled to a vibratory body and to a structure to be isolated from vibration produced by said body, said driver including a movable element in contact with said body, means responsive to vibration of said structure which provides an electrical signal corresponding thereto, an amplifier coupled to said vibration responsive means for receiving said signal, and means for connecting said amplifier to said driver to drive said movable element of driver into vibratory motion in phase with the motion of said body.

2. Vibration isolation apparatus comprising a support structure, means supported on said structure for sensing mechanical vibrations and transducing vibrations into a corresponding electrical signal voltage, a driver element resting on said sensing means to provide a base for a vibratory body, said driver comprising a member having piezoelectric characteristics such that motion of said vibratory body is produced when driving voltage is applied to said member, and an amplifier coupling said sensing means to said member.

3. Vibration isolation apparatus comprising a support structure, a driver element, a sensor positioned between said driver and said support structure, said sensor including means for sensing mechanical vibrations and translating said vibrations into a corresponding electrical signal, said driver comprising a magnetostrictive member, and means responsive to said signal for providing magnetic fields in said member, and said fields being oriented in the directions of contraction and extension of said member.

4. Vibration control apparatus comprising a vibratory body, a supporting structure therefor, an element for sensing vibrations and producing a corresponding electrical signal in response thereto, a driver element, said sensing element and said driver element being disposed between said body and said supporting structure, said driver element comprising a movable member attached to said body, electromagnetic means for producing motion of said member, and means for electrically coupling said sensing element to said electromagnetic means whereby motion of said member produced by said electromagnetic means is in response to said signal.

5. Vibration control apparatus comprising a driver element, a vibration sensing element which provides an electrical signal corresponding to said vibration in response thereto, said driver element comprising a yoke of magnetic material having an aperture therein, a pole piece of magnetic material disposed within said aperture, said pole piece and said yoke defining a gap therebetween, means for magnetizing said pole piece, a member flexibly suspended in said aperture in said gap, a coil wound on said member, an amplifier, means for electrically coupling said vibration sensing element to said coil, and means to apply driving forces from said member to a vibratory body.

6. Vibration control apparatus comprising means for sensing vibrations caused by a supported vibratory body and for transducing said vibration into a corresponding electrical signal, a hydraulic control system for counteracting said vibrations comprising a cylinder disposed between said body and the support therefor, a movable piston in said cylinder which forms two chambers therein, means for connecting said vibratory body to said piston, ports connected to said cylinder to provide for the flow of hydraulic fluid into and out of any one of said chambers, a four-way two-position selector valve having four ports through which hydraulic fluid enters and leaves said valve, two oppositely disposed ports on said valve being individually connected to said ports on said cylinder, a source of hydraulic fluid under pressure, two other ports on said valve being connected to inlet and outlet means of said source of hydraulic fluid, and means whereby said valve is made to oscillate between each of said two positions thereof in response to said electrical signal.

7. Vibration control apparatus for controlling vibrations of a structure caused by a vibratory body disposed thereon comprising means coupled to said structure for sensing vibration caused by said vibratory body and for transducing said vibration to electrical signals corresponding in amplitude and polarity to the magnitude and direction of said vibration, and means for supporting said body on said structure responsive to said signals for applying vibration counteracting forces between said body and said support structure corresponding in magnitude and direction to the amplitude and polarity of said signal.

8. Vibration control apparatus for controlling vibration of a structure caused by a vibratory body disposed thereon, comprising means for sensing vibration due to said body in said structure for providing an electrical signal corresponding in amplitude and polarity to the magnitude and direction of said vibration, means disposed between said body and said structure including an electrically operative device for simultaneously exerting mechanical forces on said body and said structure, and an amplifier coupling said sensing means to said electrically operative device for operation thereof to counteract said vibration in said structure of a magnitude and direction corresponding to the amplitude and polarity of said signal.

9. Vibration control apparatus for reducing the vibration of a structure supporting a vibratory body comprising means for sensing said vibration of said structure and producing an electrical signal corresponding thereto, a member disposed between said body and said structure including electrically driven means for vibrating said member, said member supporting said body on said supporting structure, and means coupling said sensing means to said driven member including an amplifier to drive said driven member into vibration motion corresponding to the motion of one of said vibratory body and said support structure and in phase opposition thereto.

10. Vibration control apparatus cooperative with a vibratory body and a support therefor comprising means for sensing vibrations caused by said vibratory body in said support and for transducing said vibrations into a corresponding electrical signal, a hydraulic control system for applying forces to said body and said support to counteract the vibration of one of said body and said support, said hydraulic control system comprising a hydraulically actuable element for applying said forces, said element being disposed between said sensing means and one of said body and said support, and means responsive to said electrical signal for controlling said system.

References Cited in the file of this patent

UNITED STATES PATENTS

| | | |
|---|---|---|
| 1,535,538 | Maxfield et al. | Apr. 28, 1925 |
| 1,605,589 | Hunt | Nov. 2, 1926 |
| 2,226,571 | McGoldrick | Dec. 31, 1940 |
| 2,358,672 | Vartia | Sept. 19, 1944 |
| 2,361,071 | Vang | Oct. 24, 1944 |
| 2,443,471 | Mason | June 15, 1948 |
| 2,765,054 | Rossman | Oct. 2, 1956 |
| 2,788,457 | Griest | Apr. 9, 1957 |